3,759,684
APPARATUS FOR MODIFYING MOLTEN GLASS BY AN ADDITIVE

German Artigas Gimenez, Aviles, Spain, assignor to Saint-Gobain, Neuilly-sur-Seine, France
Original application Feb. 24, 1970, Ser. No. 13,386. Divided and this application Oct. 12, 1971, Ser. No. 188,336
Claims priority, application France, Feb. 21, 1969, 4,440
Int. Cl. C03b *13/10, 3/00*
U.S. Cl. 65—145
18 Claims

ABSTRACT OF THE DISCLOSURE

Apparatus for introducing an additive to a width of glass moving through an enclosure at a temperature at which the glass is molten comprising chamber means within the enclosure, means to supply solid, particulate additive to the chamber means, support means for additive to heat and atmosphere of the enclosure beneath the chamber means and above the glass, and means to combine melt from the support means into a thin ribbon and to put the ribbon into the width of moving glass.

---

This application is a division of U.S. application Ser. No. 13,386, filed Feb. 24, 1970, now Pat. No. 3,656,928. This application is entitled to the benefit of the filing dates of said parent application Ser. No. 13,386 and French application No. 6,904,440 filed Feb. 21, 1969. A certified copy of the French application wil lbe found in said parent application.

This invention relates to a method of and apparatus for the continuous feeding into molten glass within a glass-melting furnace, of additives for the modification and/or treatment of the physical or chemical properties of the final product. As an example is cited colorant and like materials in the form of frit.

The introduction of material such as colorants, into the molten glass of commercial type glass-making furnaces and similar apparatus is usually effected by channeled distributors or feeders connected to feed the material into the melting furnace at a controlled rate. Such furnaces are of large capacity. The procedure enables the continuous production of glass of certain desired or unique characteristics or qualities, enabling the glass being produced to be modified as by coloration, and formed into articles of fined glass, but without effect upon the actual physical composition or nature of the amorphous glass itself.

The introduction into molten glass, or additives as mentioned in the preceding paragraphs, presents unique problems when such additives are in solid or unmelted condition and must be rapidly mixed and homogenized with the molten glass existing in the furnace. Such additives may, for instance, be in the form of minute particles of pulverized solid glass and commonly known as frit. The additives are highly concentrated in and with respect to the actual characteristics to be imparted to the glass. When frit is thus added to the glass it forms heterogeneous strings or fillets which can be intimately blended and homogenized with the molten glass, only with great difficulty. Further, additives added in the manner under discussion, unavoidably introduce air bubbles into the glass.

To remedy the problems as set forth in the immediately foregoing paragraphs it has been proposed to assure a better and more rapid mixing of the addtives with the molten glass, to melt them in an auxiliary furnace just prior to their introduction into the molten glass in the melting tank or furnace. While this procedure operates satisfactorily, it calls for an auxiliary furnace provided with its own independent heating means. Such auxiliary equipment is expensive, wasteful of heat, and adds materially to the cost per unit weight of the final product.

Further the fillets or strings of molten frit which pass directly into the molten glass, undesirably introduce air bubbles which are difficult to eliminate and, if not eliminated, created voids which detract from the appearance and value of the finished product.

The present invention has for its chief object and purpose the provision of a method and an apparatus for overcoming and obviating the aforesaid problems, in a simple, sure and inexpensive way.

It is a further object to provide a method and apparatus as aforesaid, wherein the additive ultimately homogenized with the molten glass in the melting furnace, is first deposited in solid particulate form, into a reservoir subjected to the heat emanating from the walls, the reheating burners, the gas in the feeders, and mass of intensely hot glass in the furnace, is melted in the reservoir and smoothly flowed into the glass in a continuous ribbon or stream of minute thickness.

Yet another object is to provide apparatus by which the molten additive or frit is formed into a ribbon or stream, and introduced into the glass without turbulence and without the entrainment of air bubbles into the glass.

Still another object is to provide a method and apparatus by which additives may be melted, introduced into and homogenized with the molten glass in a melting furnace, efficiently, inexpensively, without the necessity for separate and independent heating means for the frit.

Other objects and advantages of the invention will be obvious to those skilled in the art, after a study of the following detailed description, in connection with the accompanying drawing.

Figure 1:
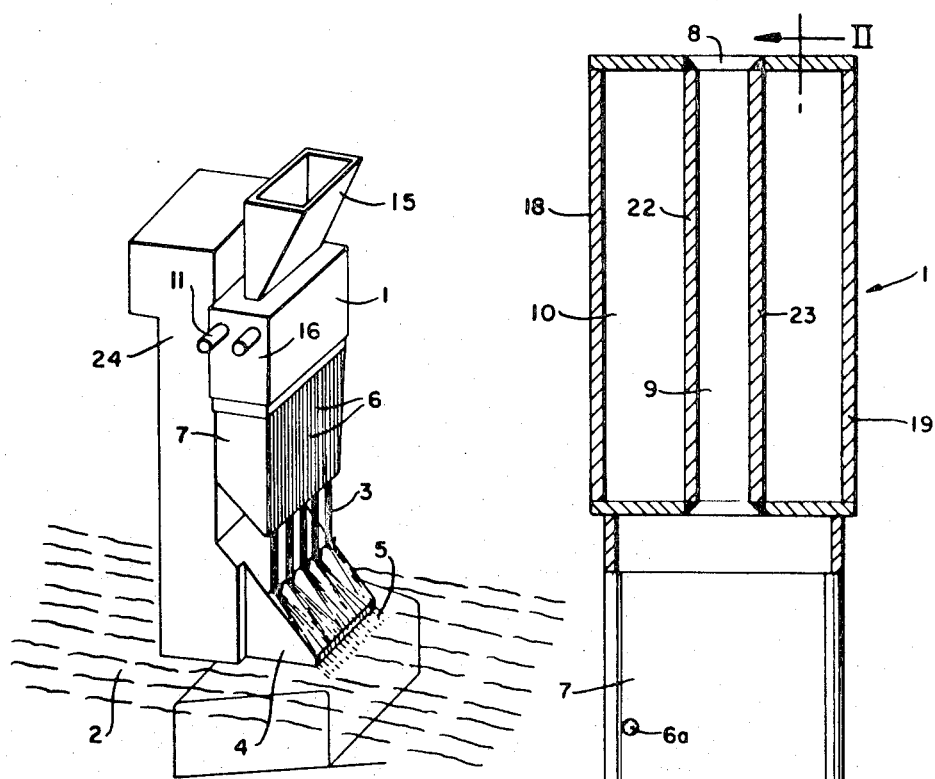
FIG. 1 is a schematic perspective view of apparatus embodying the invention.
Figure 3:
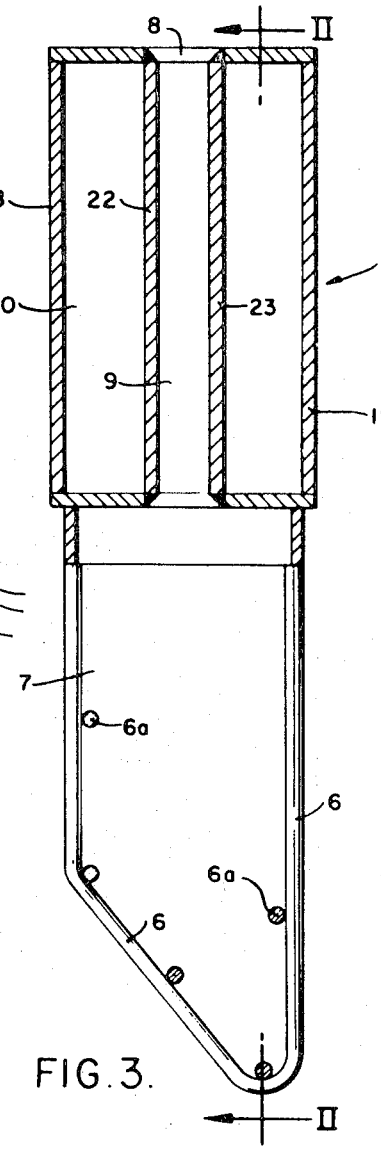
FIG. 3 is a section to about the same scale as FIG. 2, taken in a plan identified by line III—III, FIG. 2.
Figure 4:
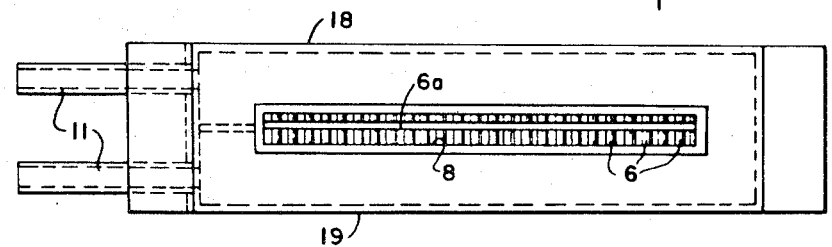
FIG. 4 is a plan view.

Referring to FIG. 1, a reservoir or container 1 for frit is mounted by supporting means 24, over a mass of molten glass 2 in the melting furnace or tank. The reservoir comprises a central vertical chamber 9, FIG. 3, supplied with frit deposited into a hopper 15, FIG. 1. The reservoir includes end walls 16, 17, FIG. 2, back and front walls 18, 19, FIG. 3, and inner walls such as 20, 21, 22, 23, spaced inwardly from, and parallel with walls 16, 17, 18 and 19 respectively and forming therewith a jacket for coolant supplied and exhausted by pipes 11, FIGS. 1, 2 and 4.

The bottom of chamber 9 is open so that frit or like additive may flow gravitationally into a grill between laterally spaced end walls 7. The grill is formed by laterally spaced, parallel, vertical bars 6 of heat resistant metal, rigidly united and interconnected in uniformly spaced relation by cross bars 6a. The spacing between bars is small so that the fusing solid particles of frit or like material cannot pass through the interstices.

Thus, as the particulate additive gravitates downwardly from chamber 9 into the space defined by the grill, it is subject to the intense heat of the atmosphere above the mass of glass 2 in the melting furnace, and thereby liquefied. The melted additive flows downwardly from the grill, in the form of a plurality of streams or filaments 3, FIG. 1, and drops onto the smooth, downwardly and forwardly inclined planar surface of an abutment 4 of heat resistant metal. From FIGS. 1 and 5 it is noted that the abutment surface has a lower lip slightly immersed below the level of the molten glass 2.

On striking the planar surface of abutment 4 the filaments of molten additive spread out thereon, into a thin smooth sheet of downwardly flowing liquid which passes without turbulence and without entrainment of gas bubbles, into the mass of molten glass where it mixes and homogenizes rapidly therewith.

Figures 2, 5:
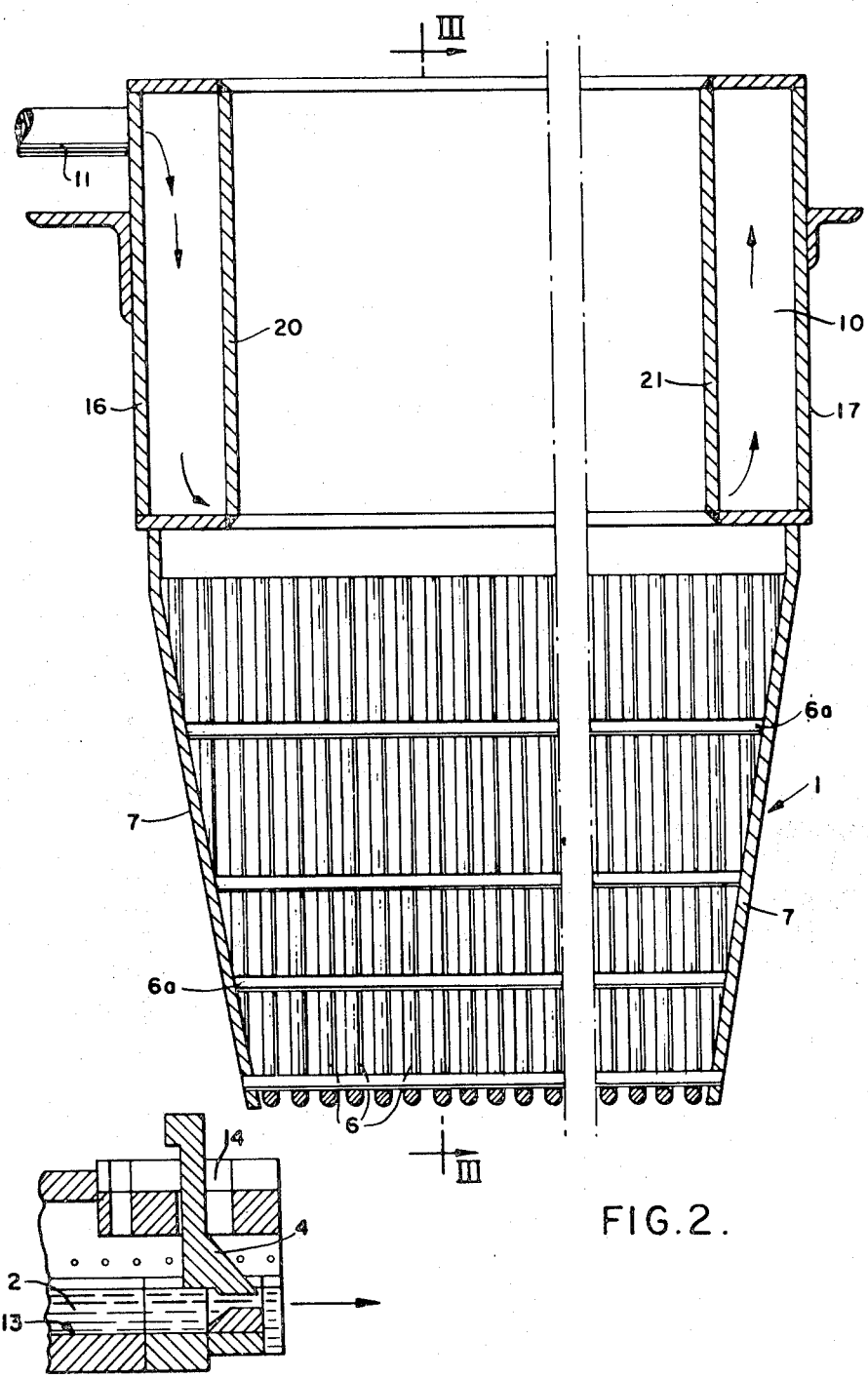
FIG. 2 is a sectional elevation to a greatly enlarged scale, taken in a plane identified by line II—II, FIG. 3.
FIG. 5 is an illustration of that portion of the apparatus by which molten additives are introduced into the surface of molten glass in the melting furnace, taken in a vertical longitudinal plane.

Referring to FIG. 5, abutment 4 may be made vertically adjustable so that it may be releasably secured in position to vary the depth to which its lower lip is immersed below the level or surface of molten glass mass 2.

While the apparatus shown is particularly useful for the addition of colorants or frits into the glass, it is also useful for adding of other materials commonly introduced into glass to alter its physical and/or chemical properties.

Having fully disclosed the invention, what I claim and desire to secure by Letters Patent is:

1. Apparatus for introducing an additive to a width of glass moving through an enclosure at a temperature at which the glass is molten comprising chamber means extending within the enclosure, means to supply solid, particulate additive to the chamber means, support means for said additive exposed to heat and atmosphere within the enclosure beneath the chamber means and above the glass whereby the additive is melted, and plate means to spread the melted additive from the support means into a thin ribbon and to put the ribbon into the width of moving glass.

2. Apparatus for introducing an additive to a width of glass moving through an enclosure at a temperature at which the glass is molten comprising means to introduce solid particulate additive to the enclosure, means to receive the additive and retain it above the glass until it is melted by the heat of the enclosure, and for converting the molten additive into a thin ribbon and delivering the formed ribbon to the width of moving glass.

3. Apparatus according to claim 2 in which the means to receive the additive comprises an open, vertically aligned chamber subtended by a grill constructed and arranged to retain solid particles, and means to deliver molten additive to the means for converting it into a ribbon.

4. Apparatus according to claim 3 in which the grill is comprised of a multiplicity of vertically arranged parallel bars of minimal spacing, united by cross bars.

5. Apparatus according to claim 4 in which the vertically arranged bars have inclined portions directed toward the ribbon forming means.

6. Apparatus according to claim 5 in which the receiving chamber is provided with cooling means.

7. Apparatus according to claim 5 in which the ribbon forming means comprises a smooth, downwardly and forwardly inclined planar surface.

8. Apparatus according to claim 7 in which the ribbon forming means is adjustable to vary the elevation of the lower forward edge thereof with relation to the level of the flowing glass.

9. Apparatus for the introduction into a mass of molten glass in a melting furnace, of an additive to be homogenized therewith, comprising, a reservoir for the additive, mounted in the furnace within the hot atmosphere above the mass of molten glass therein, first means connected with said reservoir to receive the particulate additive therefrom and effect the circulation therethrough, of hot gas to melt the additive and form the same into a plurality of discrete freely falling filamentary streams, and second means forming an inclined planar surface having a lower edge immersed within the molten glass and positioned to be impacted by the filamentary streams, and means for feeding solid particulate additive to said reservoir.

10. The apparatus of claim 9, said first means comprising a plurality of U-shaped bars fixed in laterally spaced parallel side-by-side relation and conjointly forming an enclosure in communication with said reservoir, and within which the particulate additive may descend and melt by the circulation therethrough of hot gas within the furnace.

11. The apparatus of claim 10, each said U-shaped bar having first and second legs of greater and lesser lengths, respectively, interconnected at their lower ends by an inclined run forming an acute angle with said leg of greater length, the space between each pair of contiguous bars at said acute angle intersection forming a filamentary stream of molten additive.

12. The apparatus of claim 11, said reservoir including a jacket for coolant, and conduit means for supplying coolant to and exhausting the same from, said jacket.

13. The apparatus of claim 9, said second means being vertically adjustable to vary the vertical position of said lower edge with respect to the level of molten glass in the furnace.

14. The apparatus of claim 10, the spacing between contiguous bars being less than the particulate size of the additive.

15. Apparatus for the manufacture of glass or the like comprising enclosed furnace means containing heating means and a body of molten glass within the furnace means and exposed to its heat, a vertically aligned chamber open to the atmosphere of the furnace, heat exchanging means associated with the outside of the chamber, means to supply a solid, particulate material to the upper part of the chamber, means below the chamber to catch and retain particulate material as it issues from the chamber and interrupt its passage as it melts in the heat of the furnace means, and distributor means below the said catch means in position to receive molten material from the catch means, spread it, and introduce it into the molten glass as a ribbon.

16. Apparatus according to claim 15 in which the catch means comprises parallel, vertically arranged bars, spaced laterally apart a distance which retains solid particles, and horizontally arranged bars joining the laterally spaced bars at vertically spaced intervals.

17. Apparatus according to claim 15 in which the distributor means comprises an inclined plane below the catch means having a lower edge dipping into the glass.

18. Apparatus according to claim 16 in which the catch means is comprised of trapezoidally shaped bars extending side by side the full width of the catch means, forming gas and heat penetrable, foraminous front, rear, and bottom walls the ends of which are closed by closure means.

References Cited
UNITED STATES PATENTS

| | | | |
|---|---|---|---|
| 2,177,000 | 10/1939 | Nash | 65—121 X |
| 1,698,491 | 11/1929 | Brasseur et al. | 65—121 X |
| 3,271,125 | 9/1966 | Lipp | 65—145 |
| 3,479,167 | 11/1969 | Ashman | 65—134 X |
| 2,178,418 | 10/1939 | Brown et al. | 65—335 X |
| 2,268,247 | 12/1941 | Fox | 65—121 X |
| 3,172,648 | 3/1965 | Brichard | 65—335 X |
| 1,992,994 | 3/1935 | Delpech | 65—134 X |
| 1,610,376 | 12/1926 | Hither | 65—335 X |
| 2,926,458 | 3/1960 | Lauck | 65—146 |

FRANK W. MIGA, Primary Examiner

U.S. Cl. X.R.

65—335, 146

UNITED STATES PATENT OFFICE
CERTIFICATE OF CORRECTION

PO-1050 (5/69)

Patent No. 3,759,684      Dated September 18, 1973

Inventor(s) German Artigas Gimenez

It is certified that error appears in the above-identified patent and that said Letters Patent are hereby corrected as shown below:

Column 1, line 21, insert --exposed-- before "to".
Column 3, line 38, after "and" insert --means--.

Signed and sealed this 12th day of March 1974.

(SEAL)
Attest:

EDWARD M. FLETCHER, JR.
Attesting Officer

C. MARSHALL DANN
Commissioner of Patents